United States Patent
Takagi et al.

(10) Patent No.: US 10,114,492 B2
(45) Date of Patent: Oct. 30, 2018

(54) INFORMATION PROCESSING DEVICE, INFORMATION PROCESSING METHOD, AND PROGRAM

(71) Applicant: SONY CORPORATION, Tokyo (JP)

(72) Inventors: Yoshinori Takagi, Kanagawa (JP); Seiko Maehara, Kanagawa (JP); Naoyuki Hirota, Kanagawa (JP); Hitoshi Mukai, Kanagawa (JP); Kazumasa Tanaka, Kanagawa (JP); Kunio Kawaguchi, Kanagawa (JP); Hiroyuki Morisaki, Kanagawa (JP); Ichiro Ogata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 462 days.

(21) Appl. No.: 14/397,907

(22) PCT Filed: Apr. 9, 2013

(86) PCT No.: PCT/JP2013/060717
§ 371 (c)(1),
(2) Date: Oct. 30, 2014

(87) PCT Pub. No.: WO2013/168503
PCT Pub. Date: Nov. 14, 2013

(65) Prior Publication Data
US 2015/0130748 A1 May 14, 2015

(30) Foreign Application Priority Data
May 7, 2012 (JP) .................................. 2012-105731

(51) Int. Cl.
G06F 3/041 (2006.01)
G06F 3/0338 (2013.01)
G06F 3/0481 (2013.01)

(52) U.S. Cl.
CPC .......... *G06F 3/0414* (2013.01); *G06F 3/0338* (2013.01); *G06F 3/04815* (2013.01); *G06F 2203/04105* (2013.01)

(58) Field of Classification Search
None
See application file for complete search history.

(56) References Cited

U.S. PATENT DOCUMENTS 5,805,137 A * 9/1998 Yasutake ............... G06F 3/0338
   341/34
5,867,169 A * 2/1999 Prater ..................... H04N 1/60
   345/604

(Continued)

FOREIGN PATENT DOCUMENTS

AU    2010271093    1/2011
CA    2 767 741     1/2011
(Continued)

OTHER PUBLICATIONS

International Search Report issued in corresponding International Application No. PCT/JP2013/060717 dated Jul. 16, 2013.
(Continued)

*Primary Examiner* — Patrick Edouard
*Assistant Examiner* — Douglas M Wilson
(74) *Attorney, Agent, or Firm* — Haug Partners LLP; William S. Frommer

(57) ABSTRACT

Provided is an information processing device including a pressure sensor configured to be capable of detecting a pressure position which is a position of a pressure portion subjected to a pressure manipulation by a user and a pressure force which is a pressure at a time of the pressure manipulation, and to have a cylindrical shape, and a position
(Continued)

specifying unit configured to specify a position in a three-dimensional space according to the pressure position and the pressure force.

6 Claims, 18 Drawing Sheets

(56) References Cited

U.S. PATENT DOCUMENTS

| | | | | | |
|---|---|---|---|---|---|
| 6,236,406 | B1* | 5/2001 | Li | ............................ | H04N 1/60 |
| | | | | | 345/426 |
| 8,023,164 | B2* | 9/2011 | Ogawa | .................. | H04N 1/622 |
| | | | | | 345/535 |
| 8,189,008 | B2* | 5/2012 | Julio | ................. | H05B 33/0863 |
| | | | | | 340/815.43 |
| 2002/0126119 | A1* | 9/2002 | Tashman | ............ | G02B 27/2271 |
| | | | | | 345/426 |
| 2003/0142144 | A1* | 7/2003 | Balakrishnan | ..... | G02B 27/2271 |
| | | | | | 715/848 |
| 2008/0043014 | A1* | 2/2008 | Tachi | ................ | G02B 27/2214 |
| | | | | | 345/419 |
| 2008/0284729 | A1* | 11/2008 | Kurtenbach | ....... | G02B 27/2271 |
| | | | | | 345/156 |
| 2010/0045705 | A1* | 2/2010 | Vertegaal | ........... | A47G 19/2227 |
| | | | | | 345/661 |
| 2010/0166336 | A1* | 7/2010 | Kondo | ................ | H04N 1/6052 |
| | | | | | 382/274 |
| 2012/0032916 | A1 | 2/2012 | Enoki | | |
| 2012/0062988 | A1* | 3/2012 | Watanabe | ............ | G02B 27/225 |
| | | | | | 359/462 |

FOREIGN PATENT DOCUMENTS

| | | |
|---|---|---|
| CN | 102365698 | 2/2012 |
| CN | 102667662 | 9/2012 |
| EP | 2416338 | 2/2012 |
| EP | 2452247 | 5/2012 |
| JP | 10-260776 | 9/1998 |
| JP | 2007-096612 | 4/2007 |
| JP | 2010-244772 | 10/2010 |
| JP | 2012-532804 | 12/2012 |
| KR | 10-2012-0022733 | 3/2012 |
| KR | 10-2012-0093148 | 8/2012 |
| MX | 2012000528 | 7/2012 |
| TW | 201037587 | 10/2010 |
| TW | 201118648 | 6/2011 |
| WO | WO 2010/113437 | 10/2010 |
| WO | WO 2011/005318 | 1/2011 |

OTHER PUBLICATIONS

Masaki Naito et al., "Evaluate usability of one handed 3D pointing methods for Cylindrical Multi-Touch Interface", Dai 72 Kai (Heisei 22 Nen) Zenkoku Taikai Koen Ronbunshu (4), Information Processing Society of Japan, Mar. 8, 2010 (Mar. 3, 2010), pp. 4-403 to 4-404.

* cited by examiner

FIG. 5
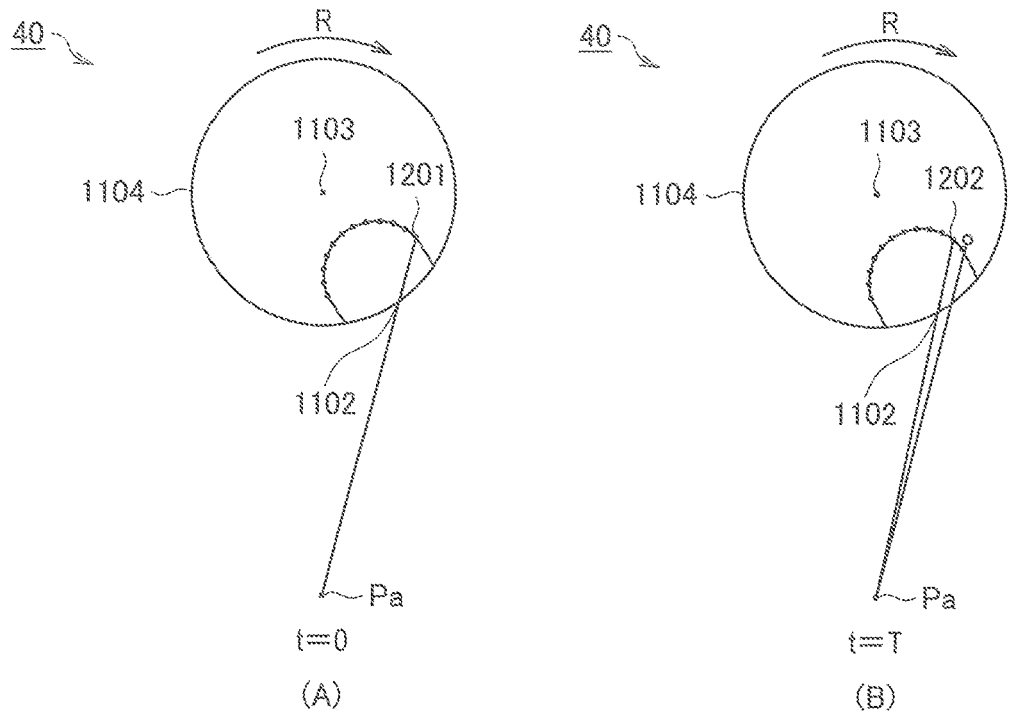
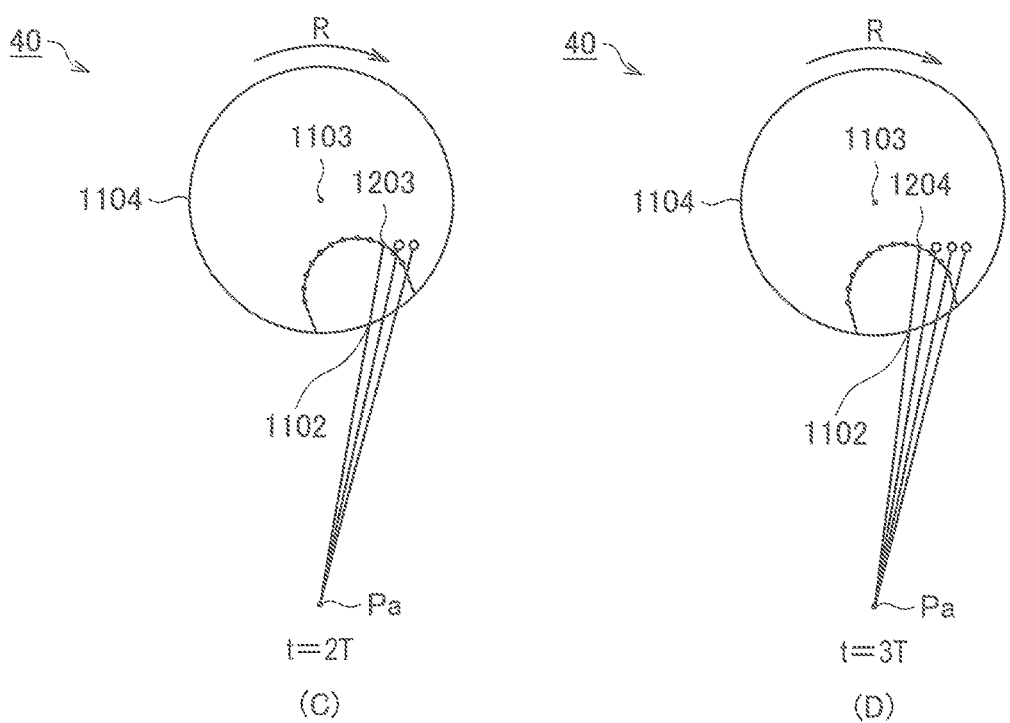

FIG. 6
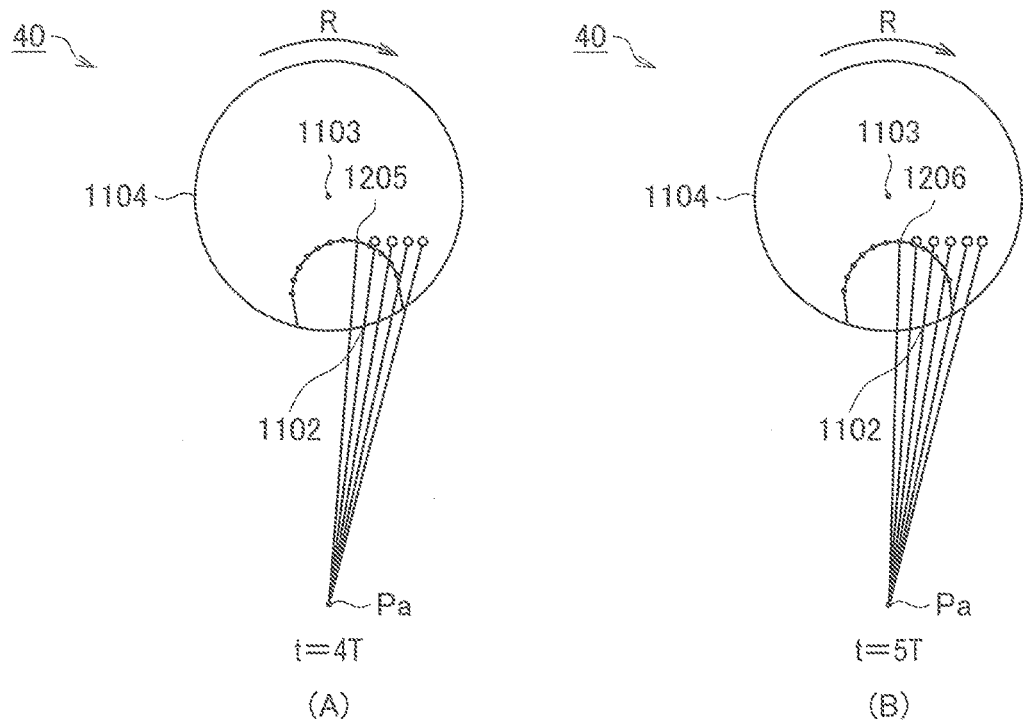
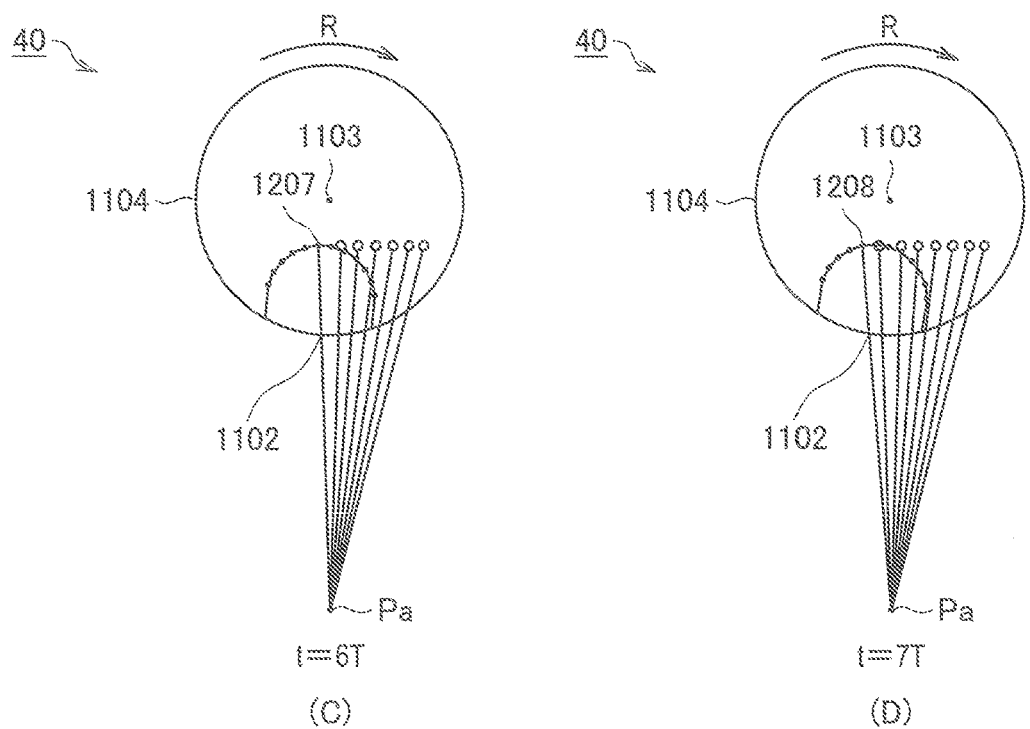

FIG. 7
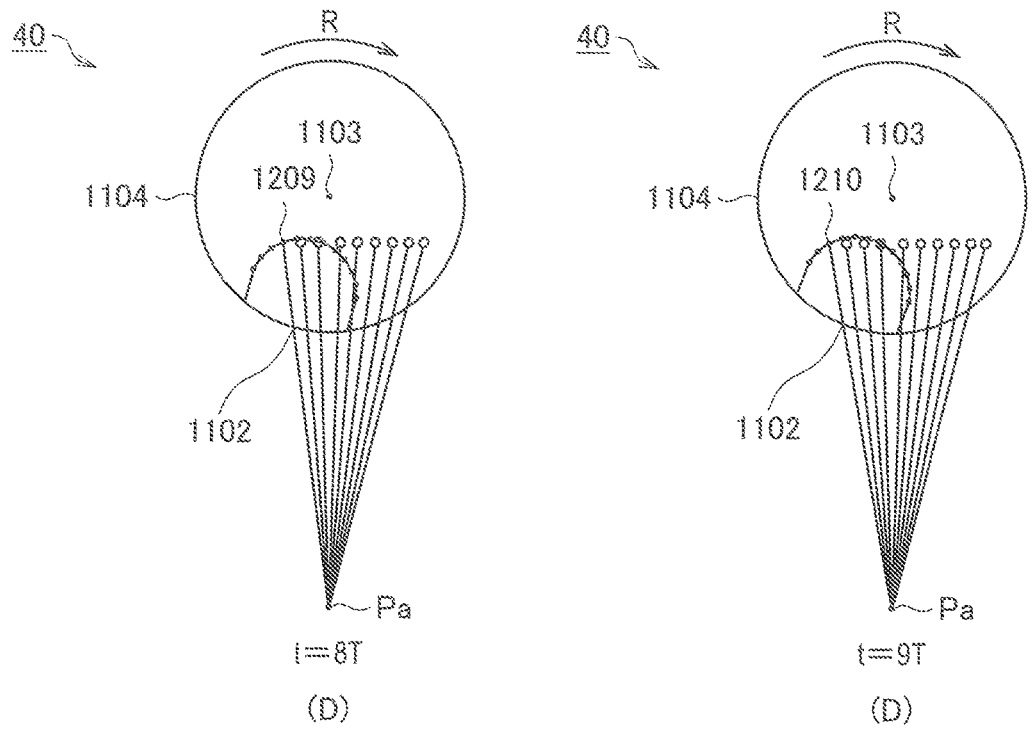
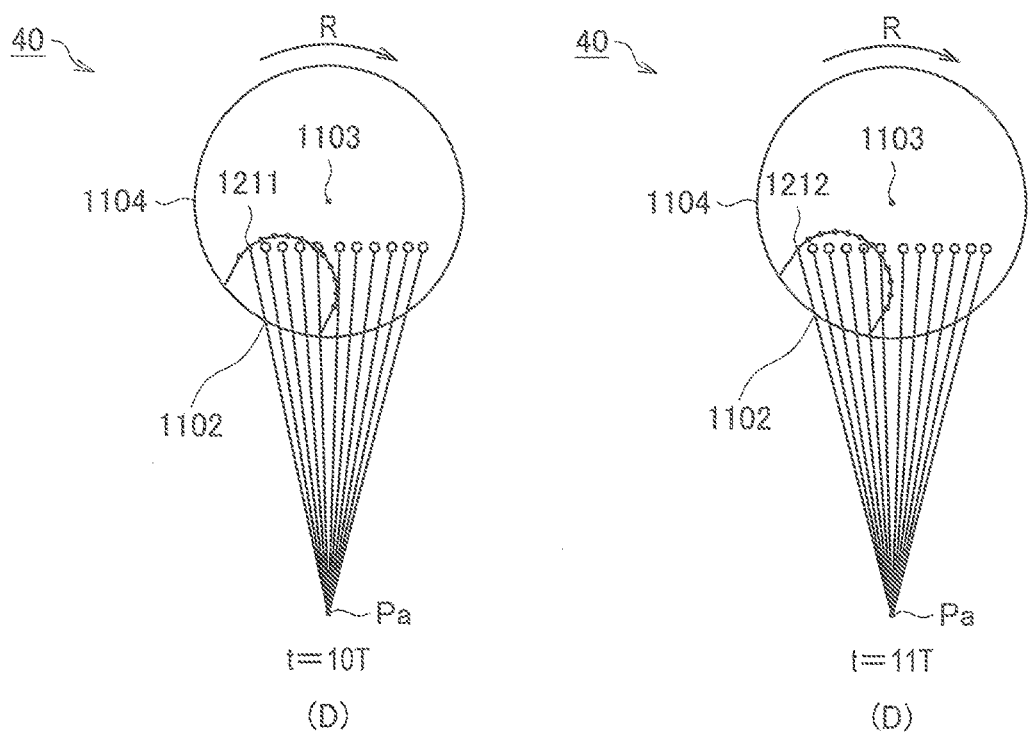

INFORMATION PROCESSING DEVICE, INFORMATION PROCESSING METHOD, AND PROGRAM

TECHNICAL FIELD

The present disclosure relates to an information processing device, an information processing method, and a program.

BACKGROUND ART

Designation of a position in a three-dimensional space has been performed in various fields. For example, in the field of color collection, designation of a color is performed by designating a position in color spaces defined with RGB, HSV, and the like. A method of designating a color is disclosed in, for example, Patent Literature 1.

CITATION LIST

Patent Literature

Patent Literature 1: JP 2007-096612A

SUMMARY OF INVENTION

Technical Problem

However, designation of a position in a three-dimensional space has been performed by combining 2-dimensional or 1-dimensional information. That is, a technology for directly designating a position in a three-dimensional space has not yet been suggested. For this reason, it is desirable to provide a technology with which a user can directly designate a position in a three-dimensional space.

Solution to Problem

According to the present disclosure, there is provided an information processing device including a pressure sensor configured to be capable of detecting a pressure position which is a position of a pressure portion subjected to a pressure manipulation by a user and a pressure force which is a pressure at a time of the pressure manipulation, and to have a cylindrical shape, and a position specifying unit configured to specify a position in a three-dimensional space according to the pressure position and the pressure force.

According to the present disclosure, there is provided an information processing method including specifying a position in a three-dimensional space according to a pressure position and a pressure force based on information given from a pressure sensor, the pressure sensor being capable of detecting the pressure position which is a position of a pressure portion subjected to a pressure manipulation by a user and the pressure force which is a pressure at a time of the pressure manipulation, the pressure sensor having a cylindrical shape.

According to the present disclosure, there is provided a program for causing a computer to realize a position specifying function of specifying a position in a three-dimensional space according to a pressure position and a pressure force based on information given from a pressure sensor, the pressure sensor being capable of detecting the pressure position which is a position of a pressure portion subjected to a pressure manipulation by a user and the pressure force which is a pressure at a time of the pressure manipulation, the pressure sensor having a cylindrical shape.

According to the present disclosure, the information processing device specifies a position in a three-dimensional space according to a pressure position and a pressure force. Accordingly, a user can find a portion corresponding to a desired position in the three-dimensional space, i.e., a pressure portion, by viewing the pressure sensor with a cylindrical shape in a circumferential direction. Then, the user can designate the desired position in the three-dimensional space by pressing the pressure portion.

Advantageous Effects of Invention

According to the present disclosure described above, a user can directly and intuitively designate a position in a three-dimensional space.

BRIEF DESCRIPTION OF DRAWINGS

FIG. 5 is an explanatory diagram (part 1) illustrating a trajectory example of light emission points observed from a viewpoint Pa.

FIG. 6 is an explanatory diagram (part 2) illustrating a trajectory example of light emission points observed from a viewpoint Pa.

FIG. 7 is an explanatory diagram (part 3) illustrating a trajectory example of light emission points observed from a viewpoint Pa.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description will be made in the following order.
1. First embodiment (example in which 360-degree display is used)
1-1. Configuration of information processing device
1-2. Order of processes performed by information processing device
2. Second Embodiment
2-1. Configuration of information processing device (example in which flexible display is used)

<1-1. Configuration of Information Processing Device>

In an embodiment, a technology for directly designating a position in a color space focusing on the color space as a three-dimensional space will be disclosed. Designation of a color is performed by designating a position in a three-dimensional space called a color space. In the field of color collection or the like, methods of using color sample books, Munsell charts, or the like expressed 1-dimensionally or 2-dimensionally have been disclosed as methods of performing designation of a color. In such methods, however, users may not directly designate positions in color spaces since the users designate a color by combining a plurality of color sample books or Munsell charts. Further, when a resolution of a color is intended to be increased with such methods, considerably many sheets of color samples or Munsell charts are necessary, and thus large areas are necessary or it is difficult to search for a desired color. Accordingly, in the embodiment, a technology capable of directly designating a position in a color space and easily adjusting a resolution will be disclosed.

Figure 1:
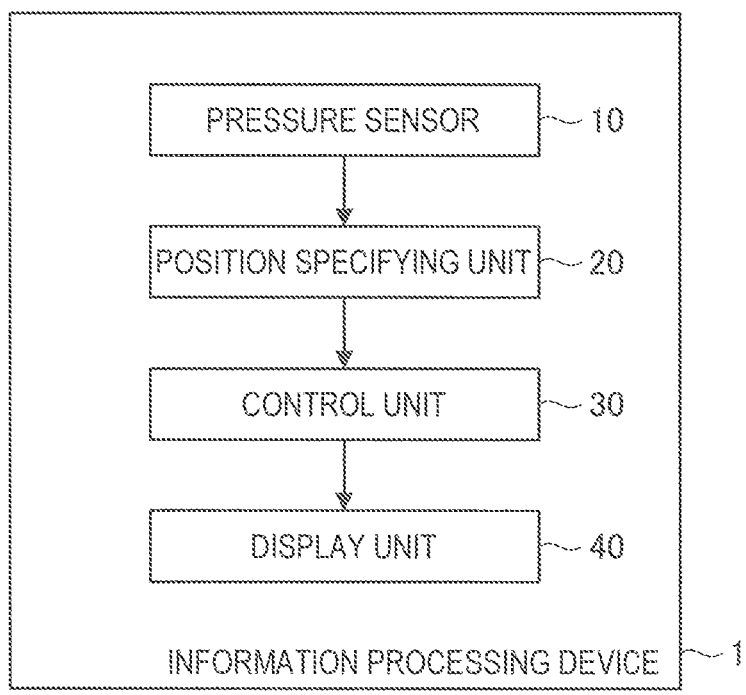
FIG. 1 is a block diagram illustrating the configuration of an information processing device according to a first embodiment of the present disclosure.
Figure 3:
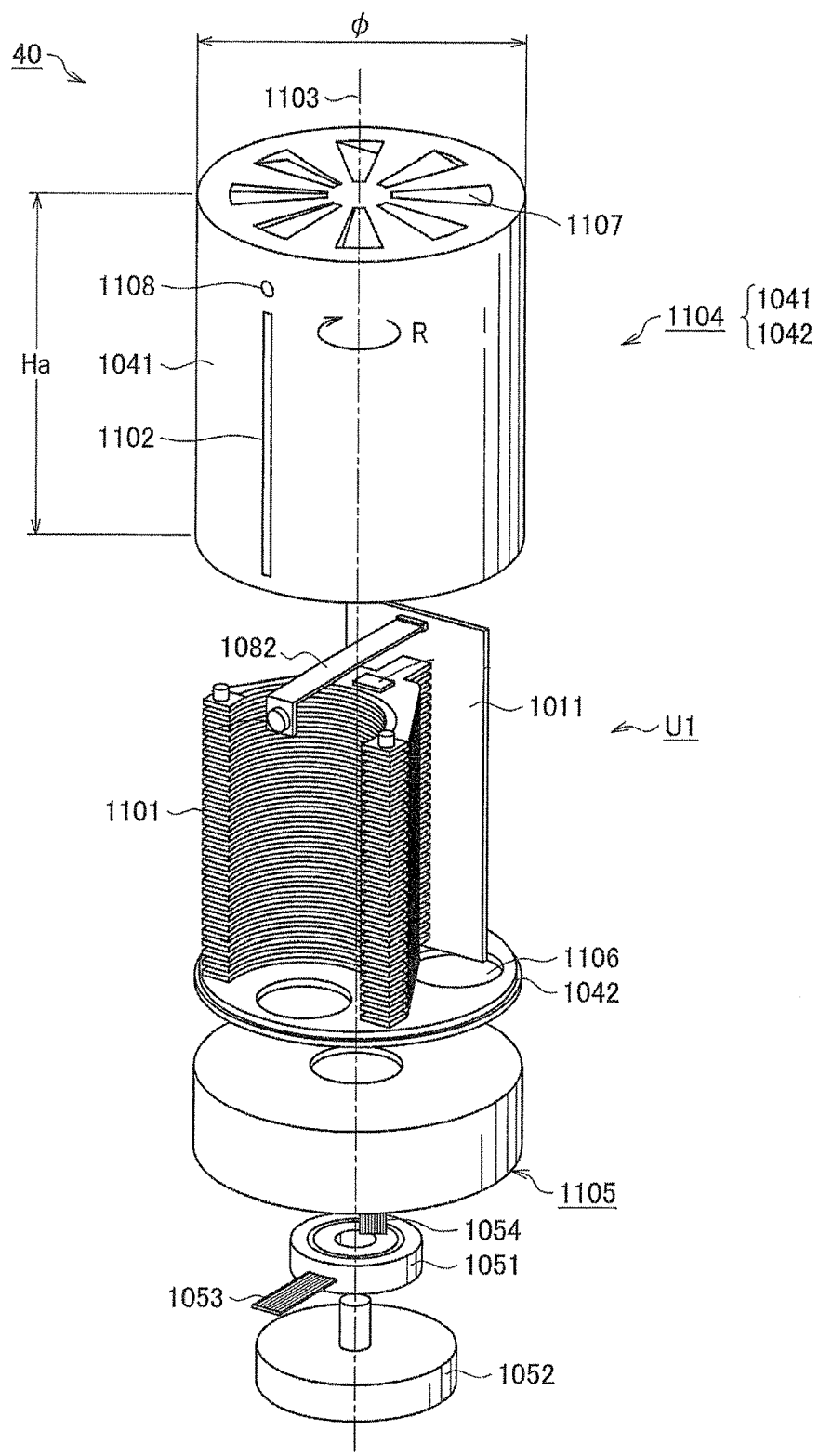
FIG. 3 is an exploded perspective view illustrating an example of the configuration of a display unit 40.

An information processing device 1 includes a pressure sensor 10, a position specifying unit 20, a control unit 30, and a display unit 40, as illustrated in FIGS. 1 and 3. The information processing device 1 also includes a hardware configuration of a CPU, a ROM, a RAM, a communication device, and the like in addition to the pressure sensor and the display unit 40, and thus the position specifying unit 20 and the control unit 30 are realized by the hardware configuration. That is, a program causing the information processing device 1 to realize the position specifying unit 20 and the control unit 30 is recorded in the ROM. Thus, when the CPU reads and executes the program, the position specifying unit 20 and the control unit 30 are realized.

[Configuration Example of Display Unit 40]

FIG. 3 is an exploded perspective view illustrating an example of the configuration of the display unit 40. The display unit 40 is a so-called 360-degree display. The details of a 360-degree display have been disclosed in, for example, JP 2011-107665A. Accordingly, an overview of the configuration and an operation principle of the display unit 40 will be described. The display unit 40 illustrated in FIG. 3 configures an example of a light-beam reproduction type stereoscopic image display device and includes a 2-dimensional light-emitting element array 1101, a rotational unit 1104 with a slit, and an installation stand 1105 with a driving mechanism. The display unit 40 reproduces a stereoscopic image of the entire periphery of a subject based on 2-dimensional video information or the like (hereinafter, simply referred to as video data Din) for stereoscopic image display imaged around the entire periphery of the subject or generated by a computer.

The rotational unit 1104 includes an exterior body 1041 with a slit and a turntable 1042 with an intake port. The exterior body 1041 is mounted on the turntable 1042. The turntable 1042 has a disk-like shape and a rotational shaft 1103 is formed at the central position of the turntable 1042. The rotational shaft 1103 serves as a rotational center of the turntable 1042 and serves as a rotational center of the exterior body 1041, and is also referred to as the rotational shaft 1103 of the rotational unit 1104 below. An intake port 1106 is formed at a predetermined position of the turntable 1042 and air is configured to be taken into the exterior body 1041.

At least one 2-dimensional light-emitting element array 1101 with a predetermined shape is provided inside the exterior body 1041 on the turntable 1042. The 2-dimensional light-emitting element array 1101 is, for example, an array in which m rows×n columns of light-emitting elements are arranged in a matrix form. A self-luminous element such as an organic EL, a light-emitting diode, or a laser diode is used as the light-emitting element. The 2-dimensional light-emitting element array 1101 is configured such that the plurality of light-emitting elements emit light in response to rotation of the rotational unit 1104 and light emission is controlled based on the video data Din for a stereoscopic image. The light emission control is performed by the control unit 30 to be described below.

Of course, the light-emitting element is not limited to the self-luminous element, but may be a light-emitting device in which a light source and a modulation element are combined. Any light-emitting element or light-emitting device may be used as long as the light-emitting device is a light-emitting device that can follow a modulation speed of the rotational unit 1104 at the time of slit rotation scanning with respect to a viewpoint Pa (see FIG. 4). In the 2-dimensional light-emitting element array 1101, a driving circuit (driver) driving the light-emitting elements is mounted in addition to the light-emitting elements.

For example, the 2-dimensional light-emitting element array 1101 has a lamination structure in which a plurality of 1-dimensional light-emitting element substrates in which the plurality of light-emitting elements are disposed (mounted) in a line form are laminated along the rotational shaft 1103 on a small-cut surface formed by notching a printed wiring substrate in a bent shape (for example, an arc-like shape). In this configuration, the 2-dimensional light-emitting element array 1101 having a light emission surface with a curved surface shape (for example, an arc-like shape) can be easily configured.

The exterior body 1041 mounted to cover the 2-dimensional light-emitting element array 1101 on the turntable 1042 has a cylindrical shape with a predetermined diameter φ and a predetermined height Ha. The diameter φ of the exterior body 1041 is in the range of about 100 mm to about 200 mm and the height Ha is in the range of about 400 mm to about 500 mm. A slit 1102 is formed at a predetermined position on the peripheral surface of the exterior body 1041. The slit 1102 is punched in a direction parallel to the rotational shaft 1103 on the peripheral surface of the exterior body 1041 and is fixed on the front side of the light emission surface of the 2-dimensional light-emitting element array 1101 to restrict an emission range of light within a predetermined range.

Of course, the slit 1102 is not limited to the holed portion, but may be a window portion formed from a transparent member through which light passes. For example, a light-emitting unit Ui (where i=1, 2, 3, etc.) is formed in a pair unit by the slit 1102 on the peripheral surface of the exterior body 1041 and the 2-dimensional light-emitting element array 1101 on the inside.

The above-described 2-dimensional light-emitting element array 1101 has a portion with a curved surface shape and a concave surface side of the curved surface shape serves as the light emission surface. The light emission surface with the curved surface shape is disposed between the rotational shaft 1103 of the rotational unit 1104 and the slit 1102 so that the light emission surface faces the slit 1102. In this configuration, it is easier for light emitted from the light emission surface with the curved surface shape to be guided (condensed) to the slit 1102 than a light emission surface with a flat shape. As the exterior body 1041, a body with a cylindrical shape is used by performing press working or roll machining on an iron plate or an aluminum plate. The inside and the outside of the exterior body 1041 are preferably coated with black so that light is absorbed. A holed portion above the slit 1102 of the exterior body 1041 is a hole portion 1108 for a sensor.

The top plate of the exterior body 1041 is formed with a fan structure so that cooling air taken from the intake port 1106 of the turntable 1042 is exhausted to the outside. For example, a slight fan portion 1107 (exhaust port) such as a blade which is an example of a cooling blade member is formed in the top plate (upper portion) of the exterior body 1041, a flow of air is produced using a rotation operation, and heat generated from the 2-dimensional light-emitting element array 1101 or its driving circuit is forcibly exhausted. The fan portion 1107 may also be used as the top plate by notching the upper portion of the exterior body 1041. When the fan portion is also used as the top plate, the exterior body 1041 becomes strong.

The fan portion 1107 is not limited to the upper portion of the rotational shaft 1103 of the rotational unit 1104, but may be mounted near the rotational shaft 1103 in the lower portion of the exterior body 1041. When the rotational unit 1104 is rotated, the flow of air oriented from the upper side to the lower side of the rotational unit 1104 or the flow of air oriented from the lower side to the upper side of the rotational unit 1104 can be produced depending on the direction of the blade of the blade member. In either case, a suction port or an exhaust port for air may be formed on the upper side or the lower side of the rotational unit 1104.

By mounting the blade member around the rotational shaft 1103, the flow of air can be produced using a rotational operation of the rotational unit 1104. Accordingly, heat generated from the 2-dimensional light-emitting element array 1101 can be exhausted to the outside without newly adding a fan motor or the like. Since the fan motor is accordingly unnecessary, cost of the display unit 40 can be reduced.

The installation stand 1105 is a portion that rotatably supports the turntable 1042. A bearing portion (not illustrated) is installed in the upper portion of the installation stand 1105. The bearing portion rotatably engages with the rotational shaft 1103 and supports the rotational unit 1104. A motor 1052 is installed inside the installation stand 1105 to rotate the turntable 1042 at a predetermined rotation (modulation) speed. For example, a direct connecting type AC motor or the like engages with the lower end of the rotational shaft 1103. The motor 1052 directly transmits a rotational force to the rotational shaft 1103 to rotate the rotational shaft 1103, so that the rotational unit 1104 is rotated at the predetermined modulation speed.

For example, a method of transmitting power or the video data Din to the rotational unit 1104 via a slip ring 1051 is adopted when the power or the video data Din is transmitted to the rotational unit 1104. According to this method, the slip ring 1051 transmitting the power and the video data Din to the rotational shaft 1103 is installed. The slip ring 1051 is divided into a fixed-side component and a rotation-side component. The rotation-side component is mounted on the rotational shaft 1103. A harness 1053 (wiring cable) is connected to the fixed-side component.

The 2-dimensional light-emitting element array 1101 is connected to the rotation-side component via another harness 1054. Between the fixed-side component and the rotation-side component, a slider (not illustrated) is configured to be electrically connected to a circular body. The slider configures a fixed-side component or a rotation-side component and the circular body configures a fixed-side component or a rotation-side component. In this structure, the power or the video data Din supplied from the outside can be transmitted to the 2-dimensional light-emitting element array 1101 via the slip ring 1051 inside the installation stand 1105.

Figure 4:
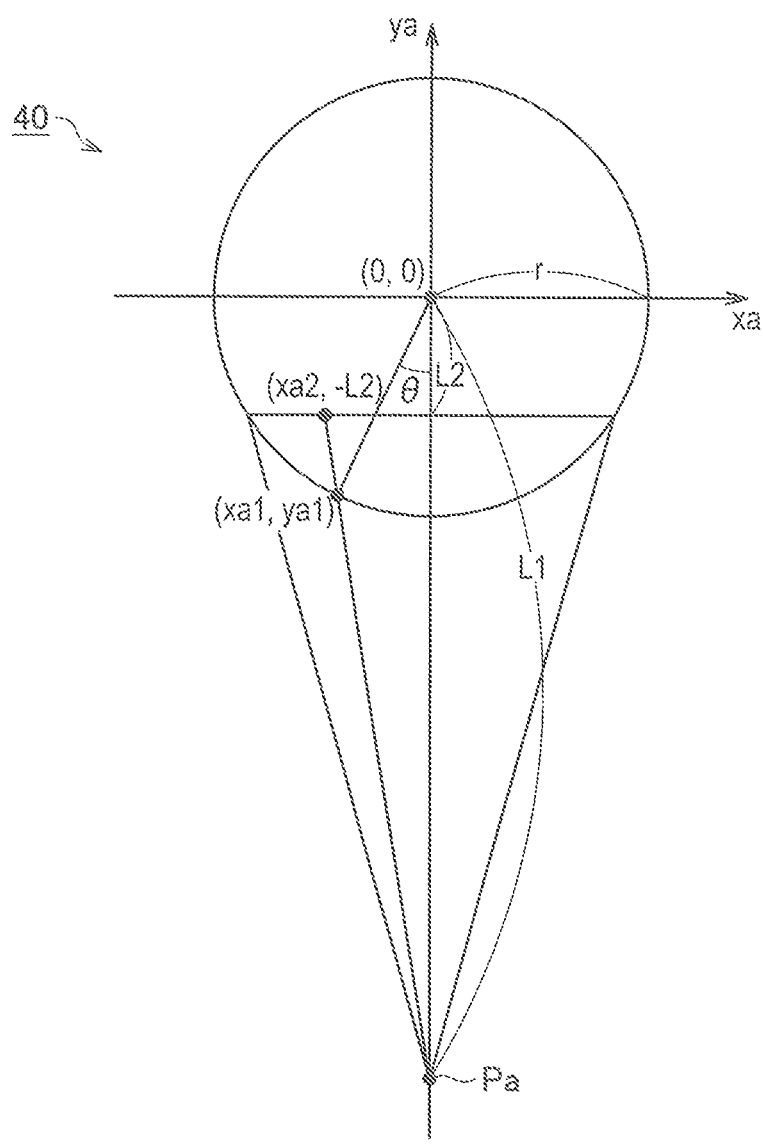
FIG. 4 is an explanatory diagram illustrating a shape calculation example of a light emission surface of a 2-dimensional light-emitting element array 1101.

FIG. 4 is an explanatory diagram illustrating a shape calculation example of the light emission surface of the 2-dimensional light-emitting element array 1101. In the example, a shape of the light emission surface of the 2-dimensional light-emitting element array 1101 on an xa-ya coordinate plane (a plane perpendicular to the rotational shaft 1103) illustrated in FIG. 4 is a curve drawn by a point $(xa(\theta), ya(\theta))$ expressed by the following equation. When the 2-dimensional light-emitting element array 1101 is formed, L1 is assumed to be the distance of a line segment from the rotational shaft 1103 of the rotational unit 1104 to any viewpoint Pa. L2 is assumed to be the shortest distance between the rotational shaft 1103 and the 2-dimensional light-emitting element array 1101. In the entire peripheral stereoscopic image display device 10, image display is realized such that a trajectory of light emission points by the 2-dimensional light-emitting element array 1101, i.e., an image display surface to be observed, becomes, for example, a plane when the device is observed from any viewpoint Pa. In this case, L2 is the same as a distance between the rotational shaft 1103 and the plane formed by the trajectory of the light emission points by the plurality of light-emitting elements.

Further, r is assumed to be a distance of a line segment from the rotational shaft 1103 of the rotational unit 1104 to the slit 1102 and $\theta$ is assumed to be an angle formed between the line segment of the distance L1 and the line segment of the distance r and an angle indicating the position of the slit 1102 with respect to the line segment of the distance L1. Further, $xa(\theta)$ is assumed to be an xa-axis coordinate value at which the curved shape of the light emission surface of the 2-dimensional light-emitting element array 1101 is formed and $ya(\theta)$ is assumed to be a ya-axis coordinate value at which the curved shape of the light emission surface of the 2-dimensional light-emitting element array 1101 is formed. Here, the xa-axis coordinate value $xa(\theta)$ satisfies equation (10), i.e.,

[Math 1]

$$xa(\theta)=r(L2-L1)\sin\theta\cos\theta/(L1-r\cos\theta)+L2\sin\theta \quad (10).$$

Further, the ya-axis coordinate value ya(θ) satisfies equation (11), i.e., $$ya(\theta)=r(L2-L1)\sin 2\theta/(L1-r\cos\theta)-L2\cos\theta \qquad (11).$$

The shape of the light emission surface of the 2-dimensional light-emitting element array 1101 is decided by the xa-axis coordinate value xa(θ) and the ya-axis coordinate value ya(θ). Here, in the drawing, (xa1, ya1) is the coordinates of the slit 1102.

Further, (xa2, −L2) is the coordinates of a light emission point actually observed from the viewpoint Pa via the slit 1102.

Accordingly, a trajectory of a light emission point observed from the viewpoint Pa via the slit 1102 can decide the shape of the light emission surface of the 2-dimensional light-emitting element array 1101 viewed as a plane. When the shape of the light emission surface is decided, the printed wiring substrate may be notched and formed in a curved shape.

[Operation Principle of Display Unit 40]

Next, an operation principle of the display unit 40, i.e., a trajectory example of the light emission point observed from the viewpoint Pa, will be described. In the display unit 40, for example, "m=12" light-emitting elements are disposed at mutually different positions, as described above, in the plane perpendicular to the rotational shaft 1103 in the 2-dimensional light-emitting element array 1101. The m light-emitting elements emit light to the outside for mutually different viewpoint positions via the slit 1102 in response to the rotation of the rotational unit 1104. Here, when the rotational unit 1104 is rotated, the direction of the rotational axis 103 is assumed to be observed from any one viewpoint position in the periphery of the rotational unit 1104. At this time, the control unit 30 to be described below controls light emission of the plurality of light-emitting elements such that, for example, a planar image is formed according to any viewpoint position inside the rotational unit 1104 by the trajectory of the light emission points by the plurality of light-emitting elements. For example, the planar image in which there is a slight disparity according to the viewpoint position is observed at each viewpoint position. Accordingly, when an observer observes the planar image from any two viewpoint positions corresponding to the position of both eyes, the observer observes, for example, the planar image in which there is a mutual disparity according to each viewpoint position. Accordingly, the observer can recognize a stereoscopic image at any position in the periphery of the rotational unit.

FIGS. 5 to 7 are explanatory diagrams illustrating a trajectory example of a light emission point observed from the viewpoint Pa. As shown in FIGS. 5A to 5D, when the rotational unit 1104 with the light-emitting unit U1 is rotated at a constant speed and rotational scanning is performed for the viewpoint Pa, the light-emitting element observed from the viewpoint Pa is moved from a light-emitting element 1201 to light-emitting elements 1202, 1203, . . . , and 1212 in this order at intervals of a time T.

A structure in which a trajectory of the light emission points (small black circles in the drawing) is viewed as, for example, a plane is realized by adjusting the shape of the light emission surface of the 2-dimensional light-emitting element array 1101 and the position of the slit 1102. For example, when the 2-dimensional light-emitting element array 1101 is observed at the viewpoint Pa via the slit 1102 at a time "t=0" illustrated in FIG. 5A, light leaking from the light-emitting element 1201 is observed.

When the 2-dimensional light-emitting element array 1101 is observed at the viewpoint Pa via the slit 1102 at a time "t=T" illustrated in FIG. 5B, light leaking from the light-emitting element 1202 is observed. A first small white circle from the right side of the drawing indicates the light emission point of the light-emitting element 1201. When the 2-dimensional light-emitting element array 1101 is observed at the viewpoint Pa via the slit 1102 at a time "t=2T" illustrated in FIG. 5C, light leaking from the light-emitting element 1203 is observed. A second small white circle in FIG. 5C indicates the light emission point of the light-emitting element 1202.

When the 2-dimensional light-emitting element array 1101 is observed at the viewpoint Pa via the slit 1102 at a time "t=3T" illustrated in FIG. 5D, light leaking from the light-emitting element 1204 is observed. A third small white circle in FIG. 5D indicates the light emission point of the light-emitting element 1203.

When the 2-dimensional light-emitting element array 1101 is observed at the viewpoint Pa via the slit 1102 at a time "t=4T" illustrated in FIG. 6A, light leaking from the light-emitting element 1205 is observed. A fourth small white circle in FIG. 6A indicates the light emission point of the light-emitting element 1204. When the 2-dimensional light-emitting element array 1101 is observed at the viewpoint Pa via the slit 1102 at a time "t=5T" illustrated in FIG. 6B, light leaking from the light-emitting element 1206 is observed. A fifth small white circle in FIG. 6B indicates the light emission point of the light-emitting element 1205.

When the 2-dimensional light-emitting element array 1101 is observed at the viewpoint Pa via the slit 1102 at a time "t=6T" illustrated in FIG. 6C, light leaking from the light-emitting element 1207 is observed. A sixth small white circle in FIG. 6C indicates the light emission point of the light-emitting element 1206. When the 2-dimensional light-emitting element array 1101 is observed at the viewpoint Pa via the slit 1102 at a time "t=7T" illustrated in FIG. 6D, light leaking from the light-emitting element 1208 is observed. A seventh small white circle in FIG. 6D indicates the light emission point of the light-emitting element 1207.

When the 2-dimensional light-emitting element array 1101 is observed at the viewpoint Pa via the slit 1102 at a time "t=8T" illustrated in FIG. 7A, light leaking from the light-emitting element 1209 is observed. An eighth small white circle in FIG. 7A indicates the light emission point of the light-emitting element 1208. When the 2-dimensional light-emitting element array 1101 is observed at the viewpoint Pa via the slit 1102 at a time "t=9T" illustrated in FIG. 7B, light leaking from the light-emitting element 1210 is observed. A ninth small white circle in FIG. 7B indicates the light emission point of the light-emitting element 1209.

When the 2-dimensional light-emitting element array 1101 is observed at the viewpoint Pa via the slit 1102 at a time "t=10T" illustrated in FIG. 7C, light leaking from the light-emitting element 1211 is observed. A tenth small white circle in FIG. 7C indicates the light emission point of the light-emitting element 1210. When the 2-dimensional light-emitting element array 1101 is observed at the viewpoint Pa via the slit 1102 at a time "t=11T" illustrated in FIG. 7D, light leaking from the light-emitting element 1212 is observed. An eleventh small white circle in FIG. 7D indicates the light emission point of the light-emitting element 1211. A twelfth small white circle in FIG. 7D indicates the light emission point of the light-emitting element 1212. Accordingly, the user can view the planar images via the slit 1102. Further, the user can view a different planar image at each viewpoint. Accordingly, the user can view a stereoscopic image. The planar image is, for example, a plane (that is, a plane 103 to be described below) in a color space.

Figure 2:
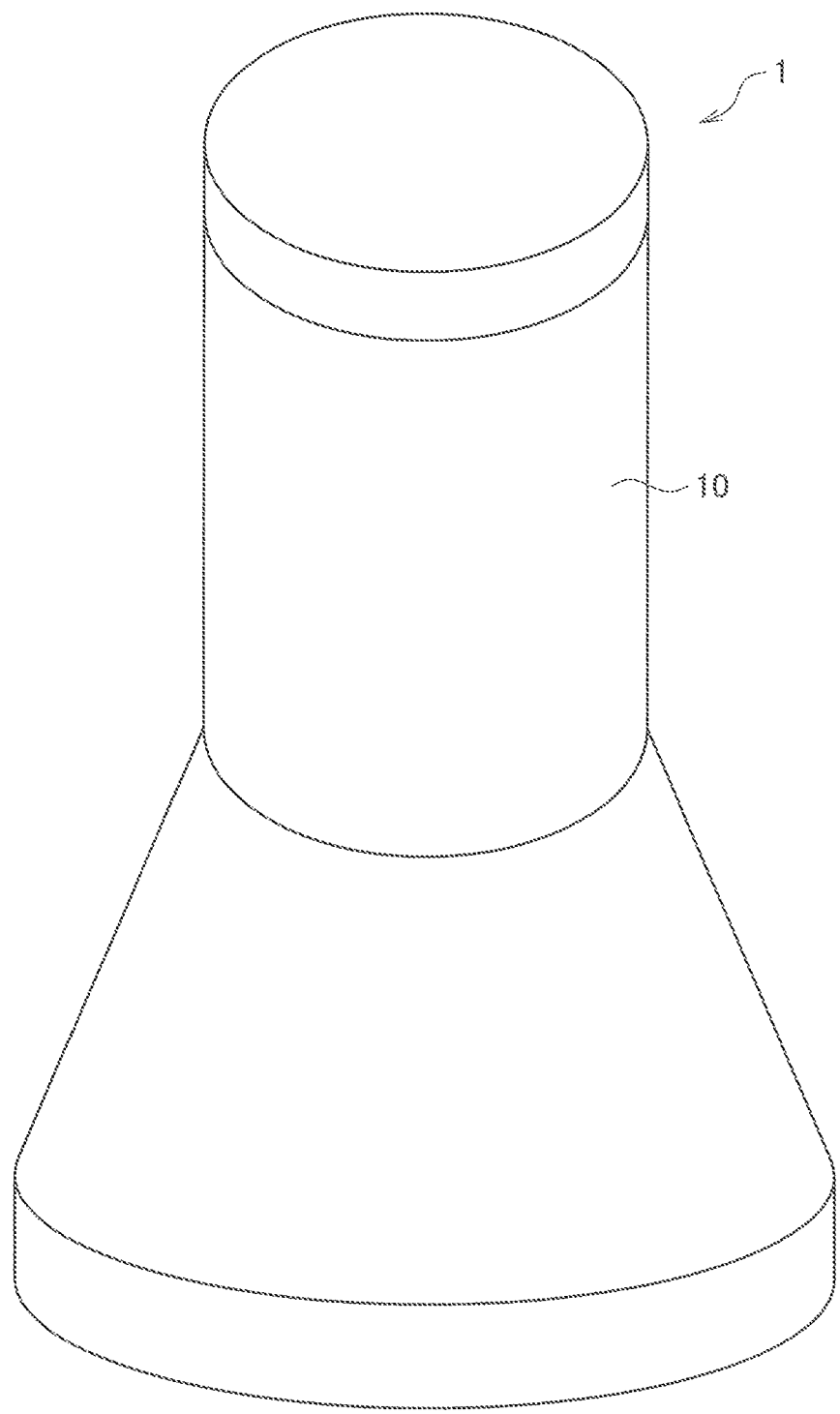
FIG. 2 is a perspective view illustrating the outer appearance of the information processing device.
Figure 8:
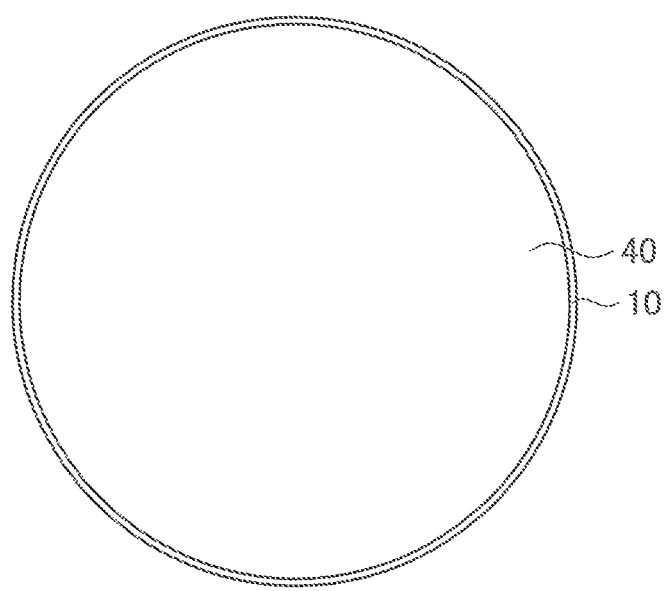
FIG. 8 is a planar sectional view illustrating a display unit and a pressure sensor.
Figure 9:
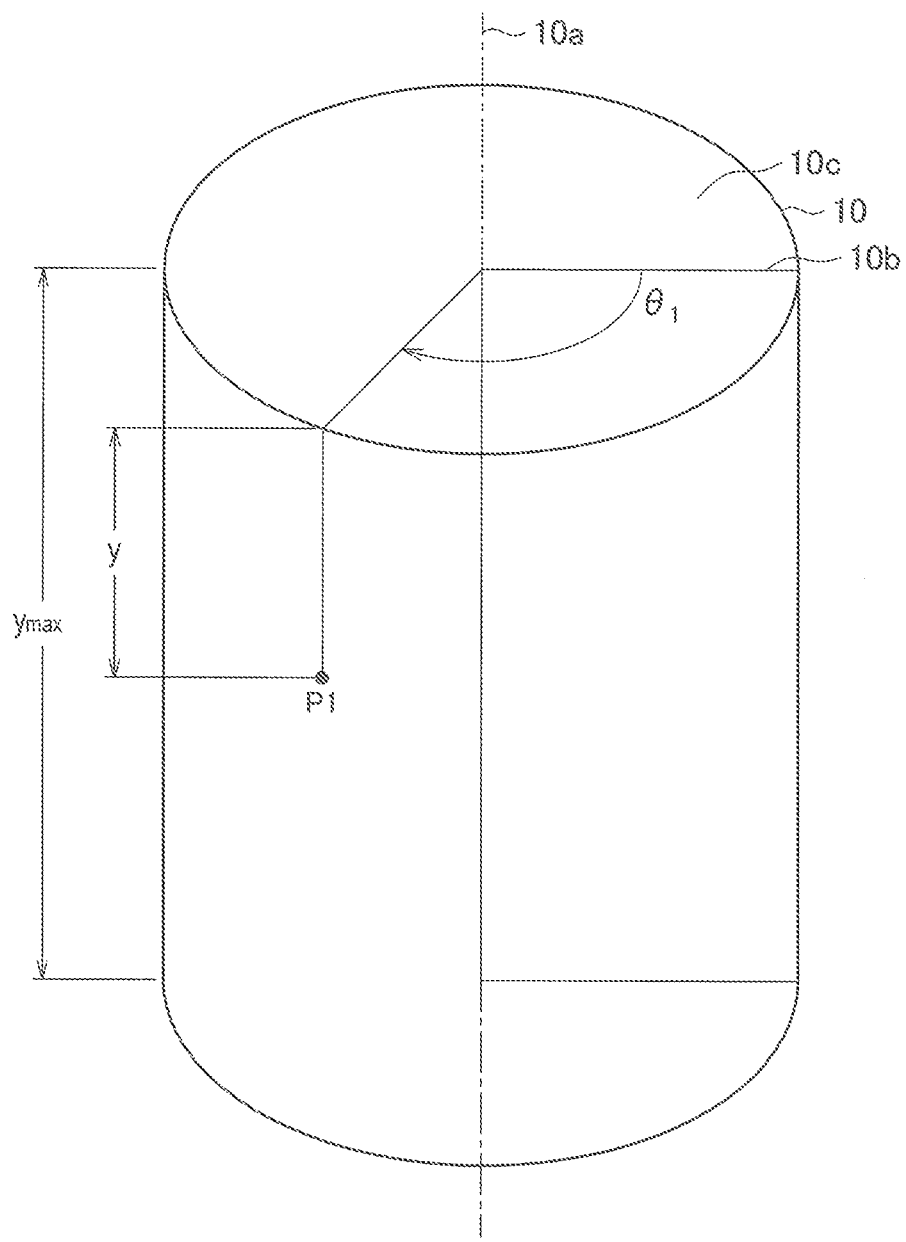
FIG. 9 is a perspective view for describing a method of specifying a pressure position of the pressure sensor.

As illustrated in FIGS. 2 and 8, the pressure sensor 10 has a cylindrical shape and the display unit 40 is disposed in its hollow portion. The display unit 40 is a so-called 360-degree display and displays a different image according to a display direction. As illustrated in FIG. 9, a reference surface 10b including a central axis 10a is set in the pressure sensor 10. The height of the pressure sensor 10 is denoted by $y_{max}$. When a user presses a point P1, the pressure sensor 10 detects an angle $\theta_1$ from the reference surface 10b to the point P1 and a distance y from an upper end surface 10c to the point P1 as the position of the point P1, i.e., a pressure position. The angle $\theta_1$ is an angle formed between a vertical line formed from the point P1 to the central axis 10a and the reference surface. Further, the clockwise rotation direction is the positive direction of the angle $\theta_1$ within which the angle $\theta_1$ has values of 0 to 360.

The pressure sensor 10 detects a pressure force P at the time of a pressure manipulation. The pressure sensor 10 generates pressure manipulation information regarding the pressure position ($\theta_1$, y) and the pressure force P and outputs the pressure manipulation information to the position specifying unit 20. The pressure manipulation information includes three-dimensional values of the angle $\theta_1$, the distance y, and the pressure force P. Accordingly, the position specifying unit 20 can specify a point P2 in the color space based on the pressure manipulation information (see FIG. 11).

Figure 10:
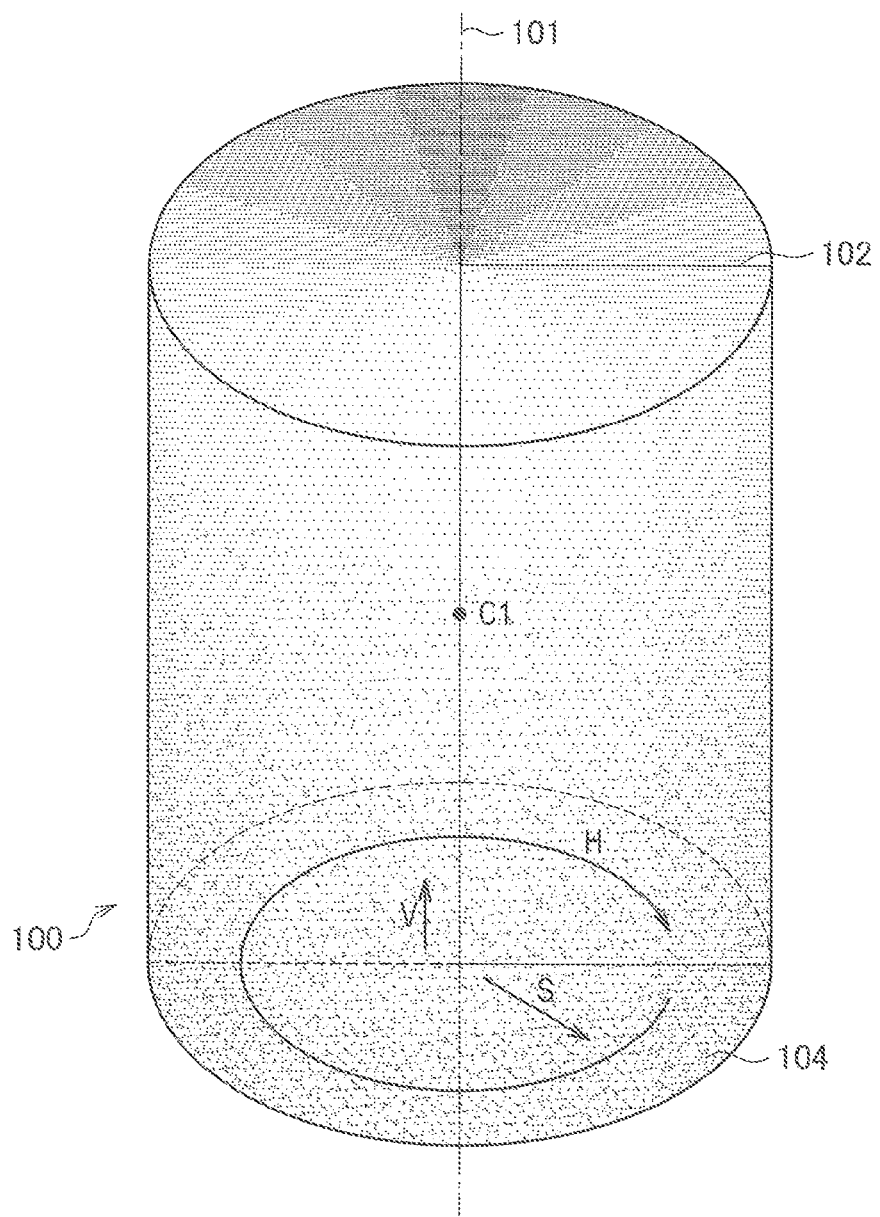
FIG. 10 is a perspective view illustrating the configuration of a color space.

Based on the pressure manipulation information, the position specifying unit 20 specifies the point P2 in the color space according to the pressure position ($\theta_1$, y) and the pressure force P. Here, a color space 100 according to the embodiment will be described with reference to FIG. 10. The color space 100 is a space defined by H (hue), S (saturation), and V (value) and has a columnar shape. A reference surface 102 is set in the color space 100. The reference surface 102 is a surface including a central axis 101 and a central point C1 and indicates red (H=0). The central axis 101 is disposed to be parallel to the central axis 10a of the pressure sensor 10. The reference surface 10b of the pressure sensor 10 and the reference surface 102 in the color space are set to overlap.

The hue is expressed by an angle from the reference surface 101 in which the clockwise rotation direction is the positive direction with values of 0 to 360. Here, 0 and 360 represent the same color (red). The saturation is expressed by a distance from the central axis 101 and has values of 0 to 1. The value is expressed by a distance from a bottom surface 104 and has values of 0 to 1.

Figure 11:
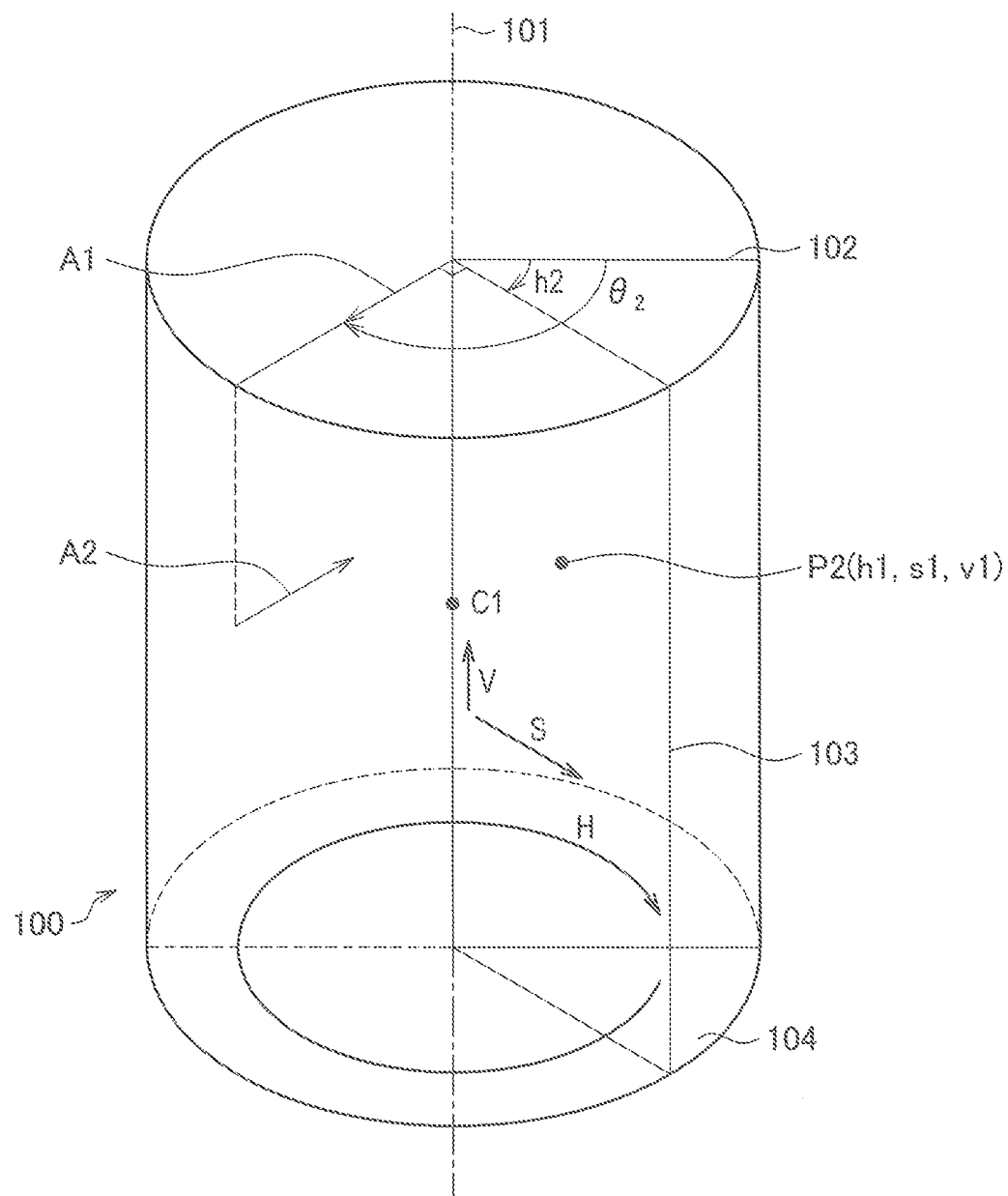
FIG. 11 is a perspective view illustrating a correspondent relation or the like between a line of sight of a user and a color space displayed on a display unit.

The position specifying unit 20 specifies the point P2 according to the pressure position and the pressure force based on the following equations (1) to (4). An example of the point P2 is illustrated in FIG. 11.

[Math 2]

FOR $\theta_1 \geq 90$ $$h1 = \theta_1 - 90 \tag{1}$$

FOR $\theta_1 < 90$ $$h1 = 270 + \theta_1 + \theta_1 \tag{2}$$

$$s1 = 1 - P/P_{max} \tag{3}$$

$$v1 = 1 - y/y_{max} \tag{4}$$

In equations (1) to (4), h1, s1, and v1 indicate the hue, the saturation, and the value of the point P2, respectively. $P_{max}$ is the maximum value of the pressure force and is set in advance. The position specifying unit 20 generates position information regarding the specified point P2 in the color space and outputs the position information to the control unit 30. The user can also press a region of a certain range instead of the pressing of the point P1. In this case, the position specifying unit 20 performs the above-described process on each point in the region to specify the region pressed by the user, i.e., the region corresponding to the pressure region in the color space. Accordingly, the user can designate a position (a point or a region) in the color space.

Figure 12:
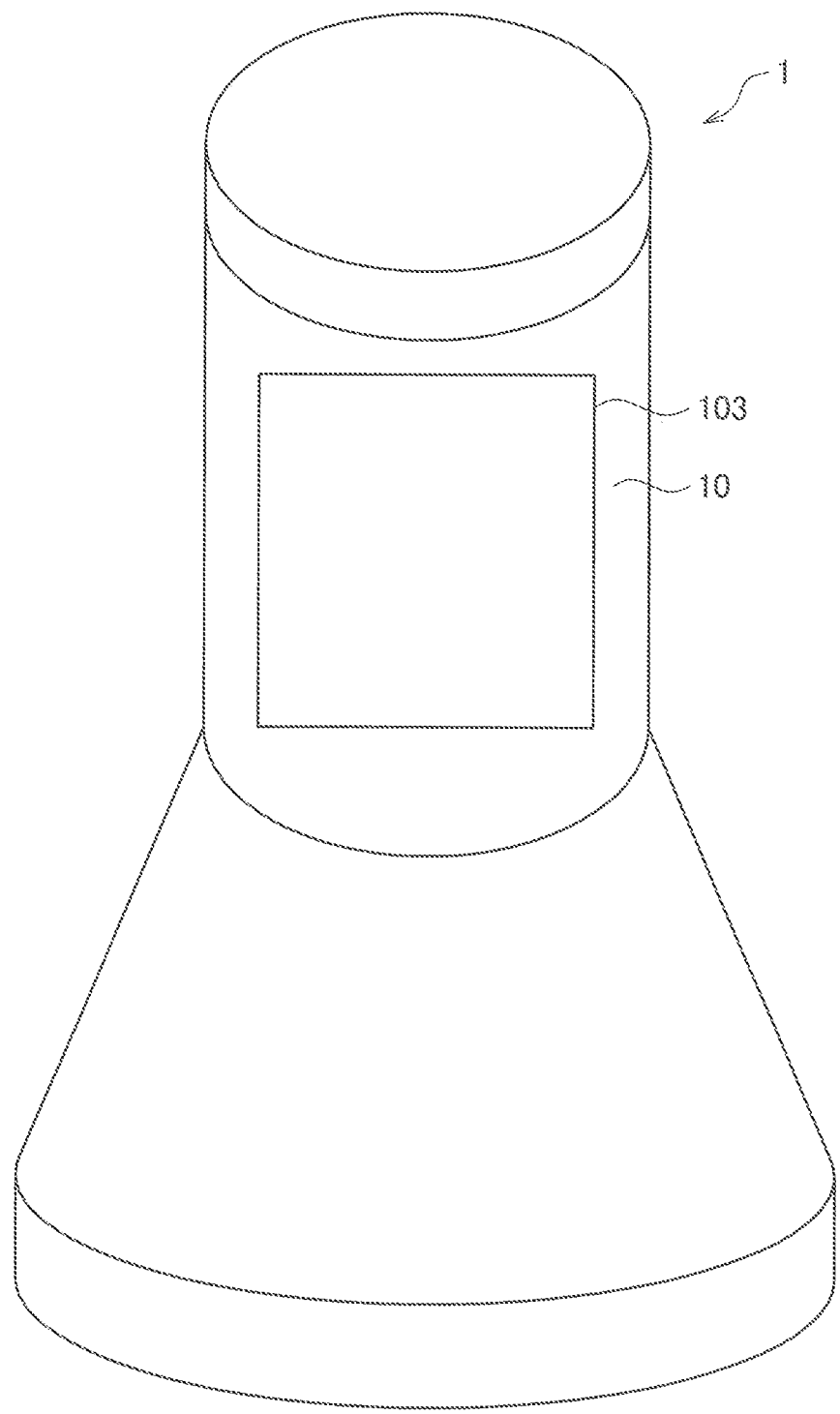
FIG. 12 is a perspective view illustrating a color space displayed on the display unit.

The control unit 30 causes the display unit 40 to display a plane which passes through the central point C1 of the color space 100 and in which a display direction vector (a vector indicating a direction in which the display unit 40 displays an image) A1 of the display unit 40 is a normal line. For example, the control unit 30 performs the following process when a display direction is the horizontal direction. That is, as illustrated in FIG. 11, the control unit 30 calculates an angle $\theta_2$ from the reference surface 102 to the display direction vector A1. The angle $\theta_2$ is an angle in which the clockwise rotation direction is the positive direction with values of 0 to 360. The control unit 30 causes the display unit 40 to display a plane 103 in which a hue h2 expressed by the following equations (5) and (6) is drawn. That is, the control unit 30 performs light emission control or the like of the 2-dimensional light-emitting element array 1101 so that the user can view the plane 103. A form in which the plane 103 is displayed on the display unit 40 is illustrated in FIG. 12.

[Math 3]

FOR $\theta_2 \geq 90$ $$h2 = \theta_2 - 90 \tag{5}$$

FOR $\theta_2 < 90$ $$h2 = 270 + \theta_2 \tag{6}$$

Figure 13:
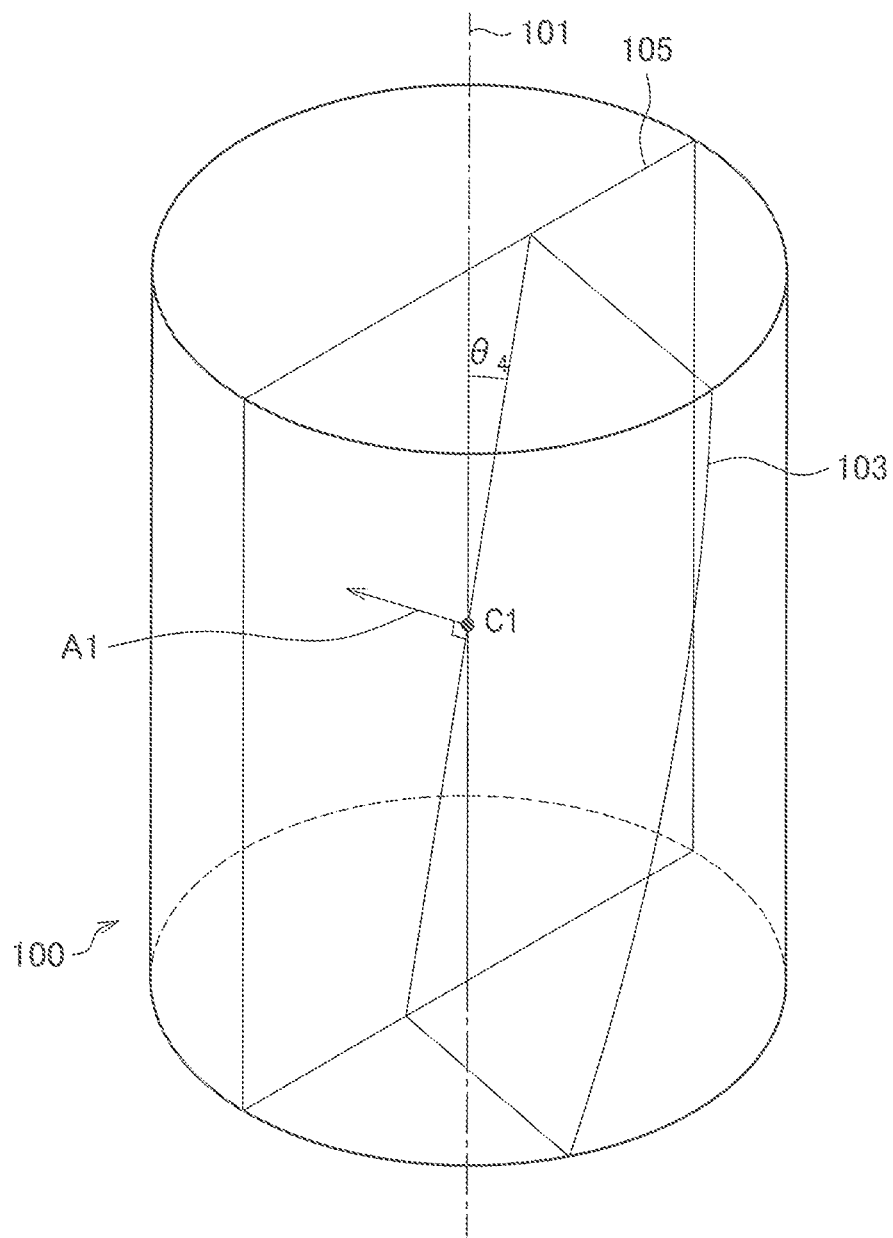
FIG. 13 is a perspective view illustrating a correspondent relation or the like between a line of sight of a user and a color space displayed on a display unit.

As illustrated in FIG. 13, the control unit 30 may cause the display unit 40 to display the plane 103 by inclining the plane 103 by an angle $\theta_4$ about the central point C1 when the display direction is inclined in the horizontal direction by the angle $\theta_4$. In this case, a hue of h2±90 is drawn on the plane 103. A plane 105 is a plane in which a hue of h2±90 is drawn.

In this way, the control unit 30 causes the display unit 40 to display different planes 103 according to the display direction of the display unit 40. When the user views the plane 103, the display direction vector A1 and a line-of-sight vector A2 of the user are parallel to each other. Accordingly, the control unit 30 causes the display unit 40 to display a plane in which the line of sight of the user is a normal line. Accordingly, the user can view various planes 103 by displacing the line-of-sight direction to any direction and can easily find a desired color from the color space.

Figure 14:
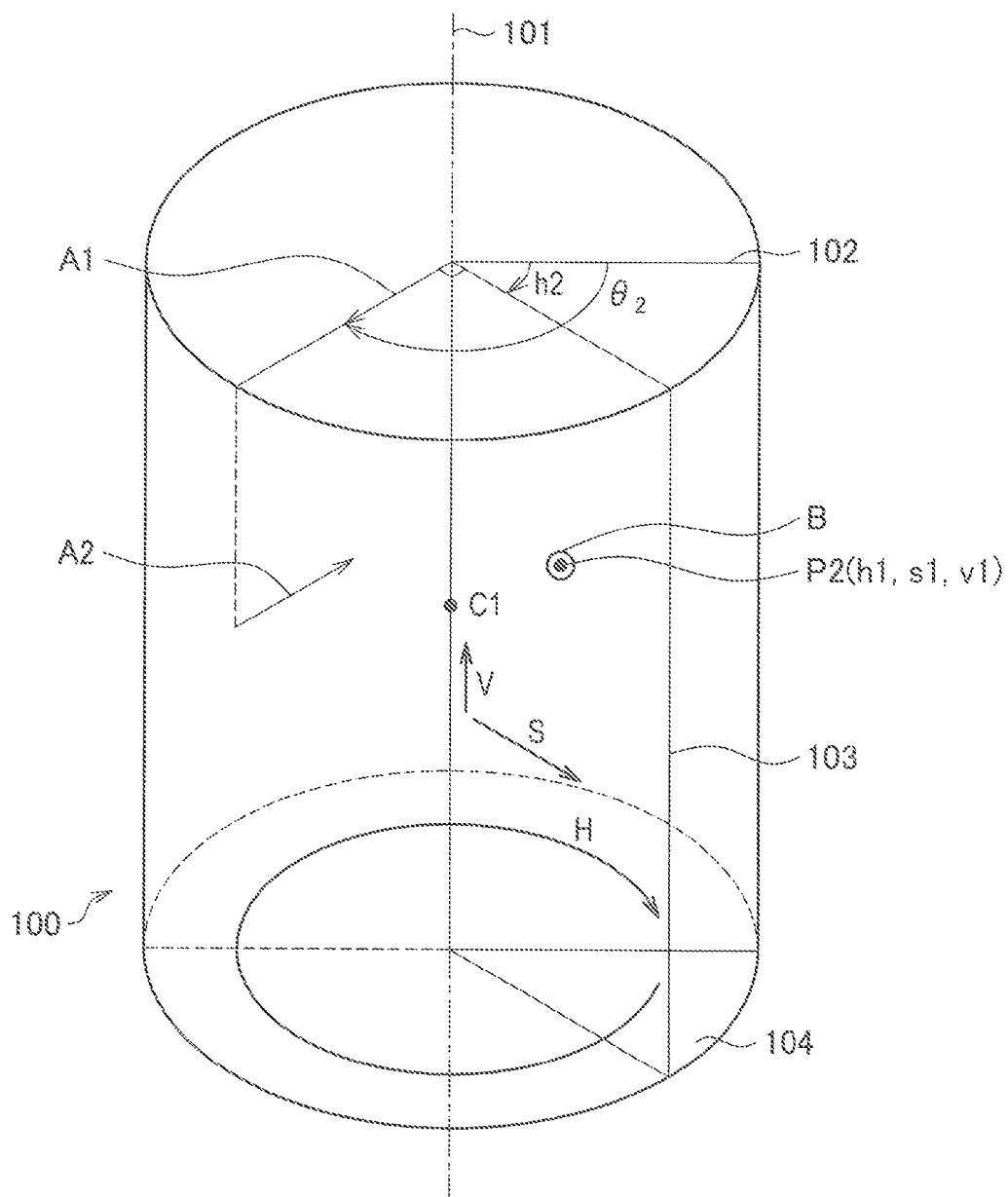
FIG. 14 is a perspective view illustrating a correspondent relation or the like between a line of sight of a user and a color space displayed on a display unit.
Figure 15:
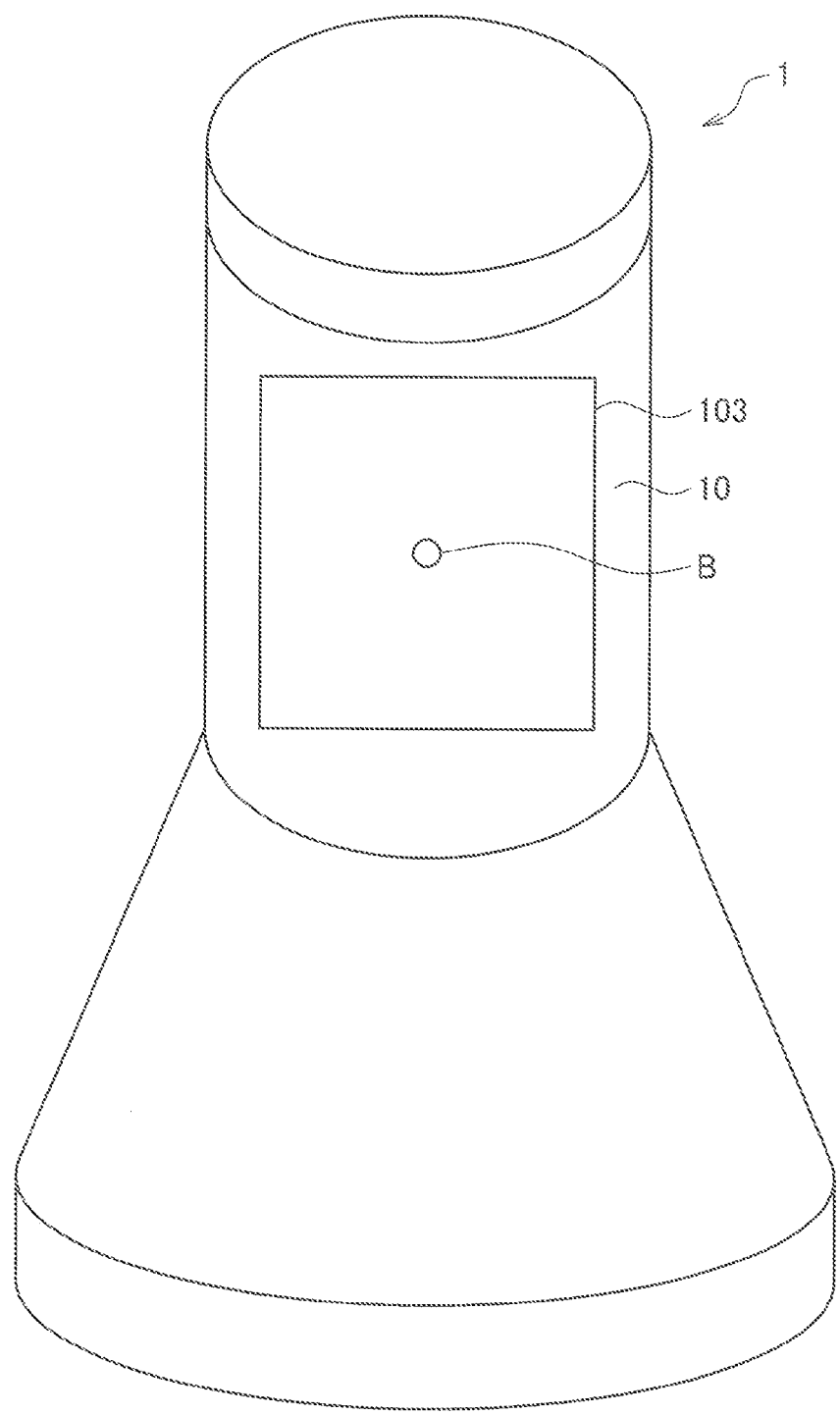
FIG. 15 is a perspective view illustrating a correspondent relation or the like between a line of sight of a user and a color space displayed on a display unit.

When the position information in the color space is given, the control unit 30 draws an icon B at a position indicated by the position information in the color space, as illustrated in FIG. 14. According to equations (1) to (6), the icon B is drawn on the plane 103 when the angle $\theta_2$ of the display direction vector and the angle $\theta_1$ of the pressure position are identical to each other. In FIG. 14, the icon B is drawn on the plane 103. Accordingly, the user can view the display unit 40 at a position away from the reference surface 10b as much as the angle $\theta_1$ and can view the icon B when performing a pressure manipulation at this position, as illustrated in FIG. 15. Conversely, when the icon B is not visible to the user, the user can find the icon B by displacing the line-of-sight direction or the pressure position.

<1-2. Order of Processes Performed by Information Processing Device>

Figure 16:
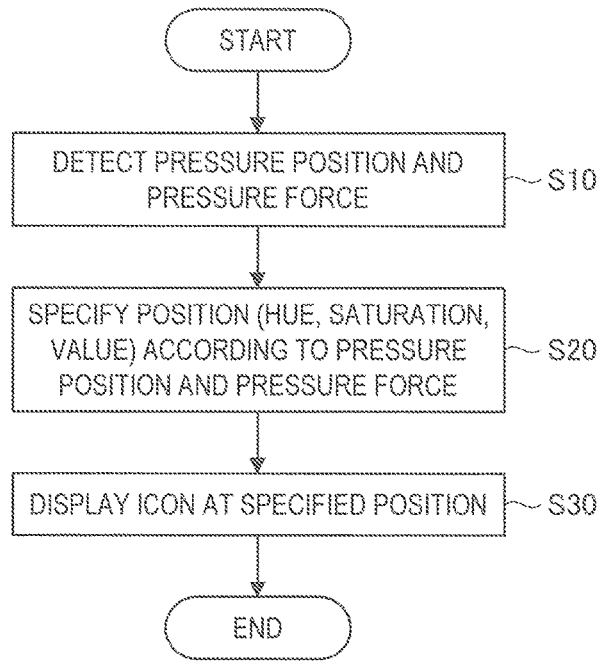
FIG. 16 is a flowchart illustrating an order of processes performed by the information processing device.

Next, an order of the processes performed by the information processing device 1 will be described with reference to the flowchart of FIG. 16. In step S10, the control unit 30 first causes the display unit 40 to display the different planes 103 according to the display direction of the display unit 40. Accordingly, the user can view the various planes 103 by displacing the line-of-sight direction in any direction and can easily find a desired color from the color space.

When the user finds the desired color, the user designates the color. Specifically, the user performs a pressure manipulation at the same position as the position at which the user views the plane 103. That is, the user performs the pressure manipulation so that the angle $\theta_1$ of the pressure position and the angle $\theta_2$ of the line-of-sight vector A2 (that is, the display direction vector A1) are identical to each other. The pressure sensor 10 detects the pressure position ($\theta_1$, y) and the pressure force P and outputs the pressure manipulation information to the position specifying unit 20.

In step S20, the position specifying unit 20 specifies the point P2 in the color space according to the pressure position ($\theta_1$, y) and the pressure force P based on the pressure manipulation information and equations (1) to (4) described above. The position specifying unit 20 outputs the position information regarding the position of the point P2 in the color space to the control unit 30.

In step S30, the control unit 30 draws the icon B at the position indicated by the position information in the color space, as illustrated in FIG. 14. The user finds the icon B by properly adjusting the line-of-sight direction. Further, the user adjusts the pressure position ($\theta_1$, y) and the pressure force P until the icon B overlaps the desired color. Accordingly, the user can designate the desired color (the position in the color space). Thereafter, the information processing device 1 ends the process.

When the control unit 30 receives an instruction to output color information from the user, the control unit 30 may output the position of the point P2, i.e., the color information regarding the hue, the saturation, and the value, to an external device, e.g., a color collection device.

As described above, according to the first embodiment, the user can find the point P1 corresponding to the desired color by viewing the pressure sensor 10 with the cylindrical shape in a circumferential direction. Then, the user can designate the desired color by pressing the point P1. Accordingly, the user can directly and intuitively designate the position in the three-dimensional space.

The information processing device 1 can accurately detect the pressure position by detecting the distance y and the angle $\theta_1$ from the reference surface 10b to the pressure portion.

Since the information processing device 1 is installed in the hollow portion of the pressure sensor 10 and displays the region among the regions in the color spaces according to the line of sight of the user, the user can easily find the desired color.

Since the information processing device 1 displays the plane 103 which passes through the central point of the color space 100 and in which the line of sight of the user is the normal line, the user can easily find the desired color.

Since the hue h2 according to the angle from the reference surface 102 to the plane 103 is drawn on the plane 103, the user can easily find the desired color.

2. Second Embodiment

Next, a second embodiment of the present disclosure will be described. An information processing device 200 according to the second embodiment is mainly different in that a line-of-sight detection unit 250 is included and the display unit 40 is a flexible display. Thus, the second embodiment will be described focusing on the differences.

Figure 17:
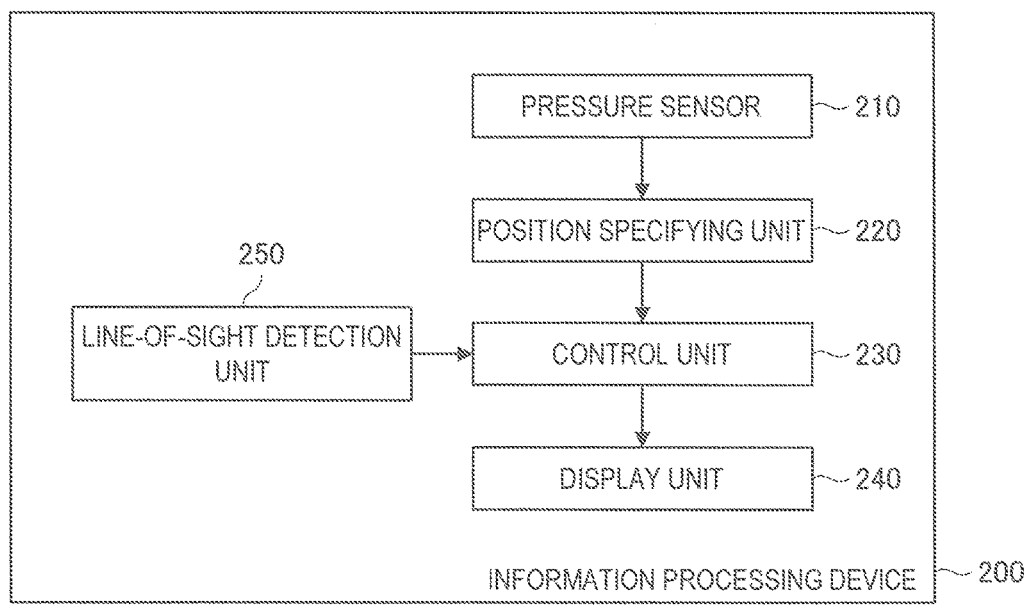
FIG. 17 is a block diagram illustrating the configuration of an information processing device according to a second embodiment of the present disclosure.
Figure 18:
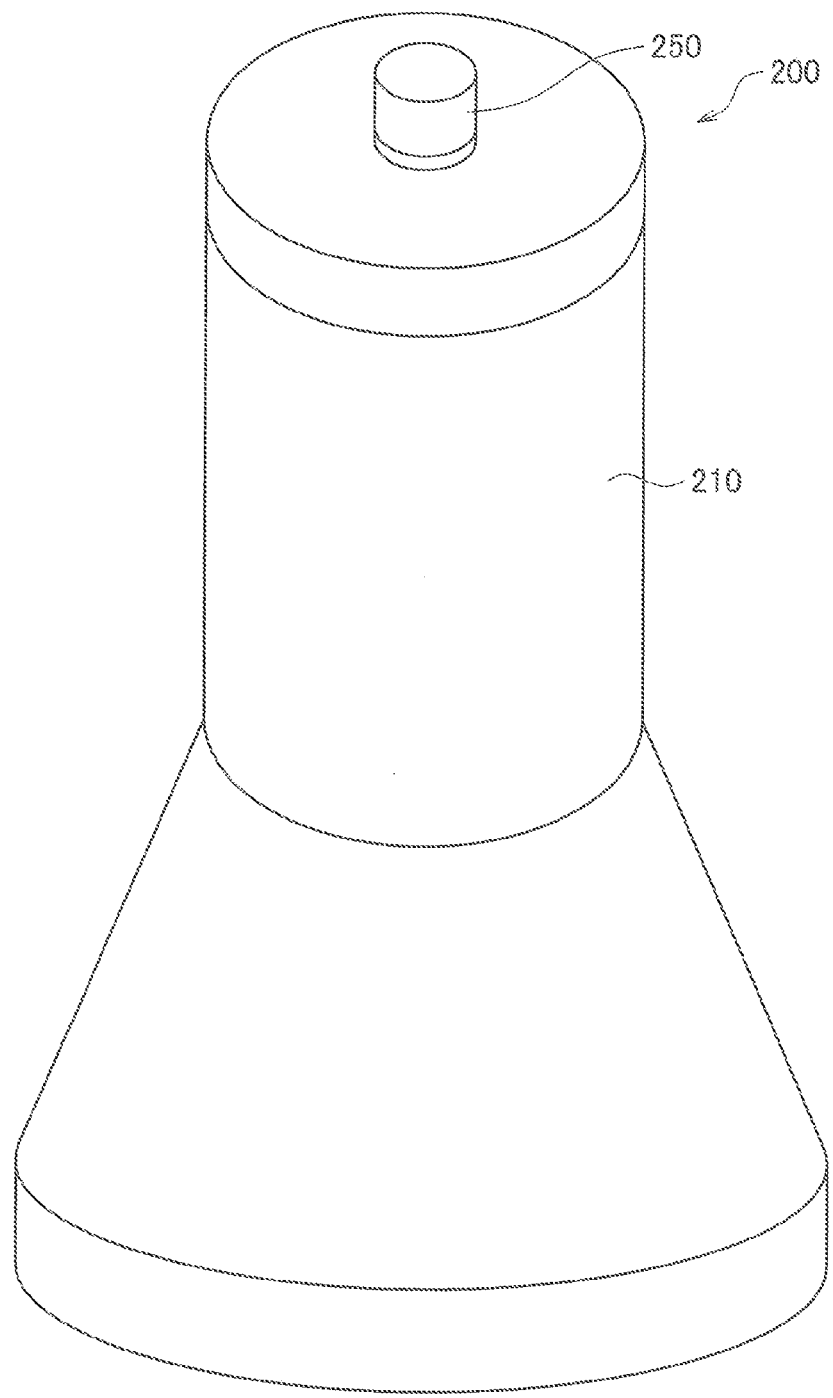
FIG. 18 is a perspective view illustrating the outer appearance of the information processing device.
Figure 19:
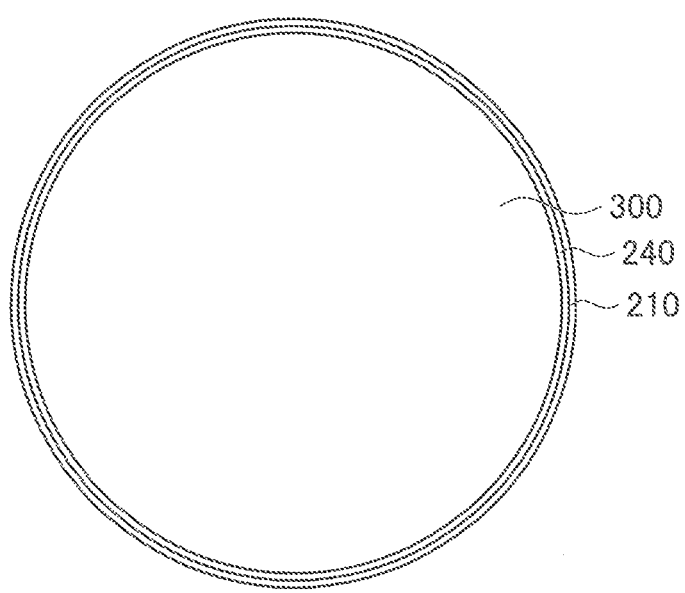
FIG. 19 is a planar sectional view illustrating a display unit and a pressure sensor.

As illustrated in FIG. 17, the information processing device 200 includes a pressure sensor 210, a position specifying unit 220, a control unit 230, a display unit 240, and a line-of-sight detection unit 250. The display unit 240 is a flexible display and is wrapped around the peripheral surface of a base substrate 300 with a columnar shape, as illustrated in FIG. 19. The pressure sensor 210 is the same as the pressure sensor 10 according to the first embodiment and is wrapped around the peripheral surface of the display unit 240. The line-of-sight detection unit 250 is a so-called 360-degree camera and is installed on the upper side of the pressure sensor 210, as illustrated in FIG. 18.

The information processing device 200 according to the second embodiment schematically performs the following process. The pressure sensor 210 performs the same process as that of the pressure sensor 10 to detect a pressure position ($\theta_1$, y) and a pressure force P. The position specifying unit 220 performs the same process as that of the first embodiment to specify a position in a color space according to the pressure position ($\theta_1$, y) and the pressure force P.

On the other hand, the line-of-sight detection unit 250 detects a line of sight of a user and outputs line-of-sight direction information regarding the detection result to the control unit 230. Based on the line-of-sight direction information, the control unit 230 causes the display unit 240 to display a plane 103 which passes through the central axis 101 of the color space 100 and in which the line-of-sight direction of the user is a normal line. The specific processing content is the same as that of the first embodiment. In the second embodiment, the same advantages as those of the first embodiment can be obtained.

The preferred embodiments of the present invention have been described above with reference to the accompanying drawings, whilst the present invention is not limited to the above examples, of course. A person skilled in the art may find various alterations and modifications within the scope of the appended claims, and it should be understood that they will naturally come under the technical scope of the present invention.

For example, in the embodiments, the technology that enables a user to designate a position in a color space has been disclosed, but a technology related to the present disclosure may be used so that a user can specify a position in another three-dimensional space, e.g., a human body.

An HSV space has been exemplified as the color space 100. However, in the embodiments, the color space is also, of course, applicable to a color space (for example, a La*a* space or an xyz space) having the same cyclic hue and 2 degrees of freedom (2 attribute values).

When a target position is determined for a color, the control unit 30 may change the color or shape of an icon according to deviation between a position designated by a user and a target position. For example, when the deviation between the position designated by the user and the target position is within a predetermined value, the control unit 30 may display the icon in red. In other cases, the control unit 30 may display the icon in black. Further, the control unit 30 may enlarge the icon when the deviation from the target position is larger.

The control unit 30 may change a color to be displayed on the display unit 40 according to the degree of color blindness of a user in consideration of a universal design. For example, a color table or a color conversion function according to the degree of color blindness may be stored in the information processing device 1 and the control unit 30 may cause the display unit 40 to display a color desired by the user based on the color table or the color conversion function and designation from the user. The control unit 30 may switch and display normal colors and colors for color blindness according to elapse of time. The control unit 30 may cause the display unit 40 to display a color complementing a color defined by each color table or color conversion function. Accordingly, a color blind user can view a color according to the degree of color blindness of the user. A normal user with no color blindness can understand which color a color blind user can recognize.

The control unit 30 may cause the display unit 40 to display a color in consideration of transparency a. The control unit 30 may change the resolution (the number of pixels displaying each piece of color information in the color space) of the color space 100 according to the pressure force P. For example, the control unit 30 may decrease the resolution (that is, increase the number of pixels displaying one piece of color information) as the pressure force P increases. Accordingly, the user can more easily designate the desired color. A pressure manipulation of adjusting the resolution is performed separately from the designation of the color information.

When a plurality of colors are designated by a user, the control unit 30 may cause the display unit 40 to display colors mixed from these colors and may output the mixed colors to an external device. The control unit 30 may erase a color other than a color designated by a user from the display unit 40. When a user designates a color, the control unit 30 may change the display position of the color based on a pressure manipulation additionally performed by the user.

Additionally, the present technology may also be configured as below.

(1)
An information processing device including:
a pressure sensor configured to be capable of detecting a pressure position which is a position of a pressure portion subjected to a pressure manipulation by a user and a pressure force which is a pressure at a time of the pressure manipulation, and to have a cylindrical shape; and
a position specifying unit configured to specify a position in a three-dimensional space according to the pressure position and the pressure force.

(2)
The information processing device according to (1), wherein the pressure sensor detects, as the pressure position, an angle from a reference surface including a central axis of the pressure sensor to the pressure portion and a position of the pressure portion in a direction of the central axis.

(3)
The information processing device according to (2), further including:
a display unit installed in a hollow portion of the pressure sensor and configured to display a region according to a line of sight of the user among regions in the three-dimensional space.

(4)
The information processing device according to (3), wherein the three-dimensional space has a columnar shape, and
wherein the display unit displays a plane which passes through a central point of the three-dimensional space and in which the line of sight of the user is a normal line.

(5)
The information processing device according to (4), wherein the three-dimensional space is a color space.

(6)
The information processing device according to (5), wherein a hue according to an angle from a reference surface in the color space to the plane is drawn on the plane.

(7)
An information processing method including:
specifying a position in a three-dimensional space according to a pressure position and a pressure force based on information given from a pressure sensor, the pressure sensor being capable of detecting the pressure position which is a position of a pressure portion subjected to a pressure manipulation by a user and the pressure force which is a pressure at a time of the pressure manipulation, the pressure sensor having a cylindrical shape.

(8)
A program for causing a computer to realize:
a position specifying function of specifying a position in a three-dimensional space according to a pressure position and a pressure force based on information given from a pressure sensor, the pressure sensor being capable of detecting the pressure position which is a position of a pressure portion subjected to a pressure manipulation by a user and the pressure force which is a pressure at a time of the pressure manipulation, the pressure sensor having a cylindrical shape.

REFERENCE SIGNS LIST

1, 200 information processing device
10, 210 pressure sensor
20, 220 position specifying unit
30, 230 control unit
40, 240 display unit
250 line-of-sight detection unit

The invention claimed is:
1. An information processing device for displaying a stereoscopic color image comprising:
a cylindrical-shaped pressure sensor operable by a user to cause a user-selected color to be displayed in a three-dimensional color space, the cylindrical-shaped pressure sensor having a first surface and a central axis intersecting the first surface, the pressure sensor configured to detect a pressure position and a pressure force exerted on the pressure sensor by the user, the pressure position being the position on the pressure sensor at the time the user exerts the pressure force, the pressure position being at an angle from a reference surface and a distance from the first surface in a direction parallel to the central axis;
a position specifying unit configured to specify a position in a three-dimensional color space determined by the pressure position whereat the pressure force is exerted on the pressure sensor and by the exerted pressure force; and
a color display unit for displaying the color image on a plane in the three-dimensional color space according to a line of sight of the user and for displaying in the image flail the color selected by the user's operation of the pressure sensor.

2. The information processing device according to claim 1, wherein the display unit is installed in a hollow portion of the pressure sensor.

3. The information processing device according to claim 2,
wherein the three-dimensional space has a columnar shape, and
wherein the display unit displays a plane which passes through a central point of the three-dimensional space and in which the line of sight of the user is a normal line.

4. The information processing device according to claim 3, wherein a hue according to the angle from the reference surface in the color space to the plane is drawn on the plane.

5. An information processing method for displaying a stereoscopic color image comprising:
selecting a color for display in a three-dimensional color space by a user specifying a position in flail the three-dimensional color space by the user exerting a pressure force at a pressure position on a cylindrical-shaped pressure sensor having a first surface and a central axis intersecting the first surface, the pressure position being the position on the pressure sensor at the time the user exerts the pressure force, the pressure position being at an angle from a reference surface and a distance from the first surface in a direction parallel to the central axis of the pressure sensor; and
displaying the color image on a plane in the three-dimensional color space according to a line of sight of the user and for displaying in the image the color selected by the pressure position and the pressure force exerted by the user on the cylindrical-shaped pressure sensor.

6. A non-transient computer-readable medium on which is recorded a program for causing a computer to realize:
a color selecting function of selecting a color for display on a three-dimensional color space by a user specifying a position in the three-dimensional color space by exerting a pressure force a pressure position on a cylindrical-shaped pressure sensor having a first surface and a central axis intersecting the first surface, the pressure position being the position on the pressure sensor at the time the user exerts the pressure force, the pressure position being at an angle from a reference surface and a distance from the first surface in a direction parallel to the central axis of the pressure sensor; and
a display function for displaying a color image on a plane in the three-dimensional color space according to a line of sight of the user and for displaying in the image the color selected by the pressure position and pressure force exerted by the user on the cylindrical-shaped pressure sensor.

* * * * *